(12) United States Patent
Harper

(10) Patent No.: US 8,186,304 B2
(45) Date of Patent: May 29, 2012

(54) AUTOMATIC LIQUID DISPENSING DEVICE FOR ANIMALS

(75) Inventor: Michael D. Harper, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 152 days.

(21) Appl. No.: 12/754,188

(22) Filed: Apr. 5, 2010

(65) Prior Publication Data

US 2011/0239950 A1 Oct. 6, 2011

(51) Int. Cl.
*A01K 7/02* (2006.01)
(52) U.S. Cl. ........................ 119/74; 119/61.55
(58) Field of Classification Search .............. 119/51.5, 119/61.54, 61.55, 72, 74, 72.5, 78, 76, 79, 119/80; 137/453; 222/457
See application file for complete search history.

(56) References Cited

U.S. PATENT DOCUMENTS

| | | | | |
|---|---|---|---|---|
| 4,286,618 A | * | 9/1981 | Bang et al. | 137/408 |
| 5,337,696 A | * | 8/1994 | Edstrom et al. | 119/456 |
| 5,809,934 A | * | 9/1998 | Gavet | 119/52.1 |
| 5,960,742 A | * | 10/1999 | O'Rourke et al. | 119/74 |
| 6,003,468 A | * | 12/1999 | Edstrom et al. | 119/72.5 |
| 6,467,428 B1 | * | 10/2002 | Andrisin et al. | 119/51.5 |
| 6,948,451 B2 | * | 9/2005 | Bond et al. | 119/665 |
| 7,270,082 B2 | * | 9/2007 | Plante | 119/74 |
| 2011/0114026 A1 | * | 5/2011 | Lathim | 119/72 |

* cited by examiner

*Primary Examiner* — Rob Swiatek
*Assistant Examiner* — Lisa Tsang
(74) *Attorney, Agent, or Firm* — Eckert Seamans Cherin & Mellott, LLC; Brij K. Agarwal

(57) ABSTRACT

A liquid dispensing device includes a container removably mounted to a tray such that an orifice in the base of the container is below a fill line of the tray. A flat-shaped cap that includes an opening is removably attached to the orifice. A cap adjustment member forces the cap into a concave shape when the container is removably mounted to the tray. If the cap is in the flat shape, surface tension of the liquid in the container prevents the container from dispensing liquid. However, forcing the cap into the concave shape disrupts the surface tension of the liquid and allows the container to dispense the liquid if the liquid is not already above a fill line. These features allow the orifice to be wide enough for cleaning while the cap is narrow enough for operation without the cap causing surface tension that hinders operation.

20 Claims, 9 Drawing Sheets

AUTOMATIC LIQUID DISPENSING DEVICE FOR ANIMALS

FIELD OF THE INVENTION

This invention relates generally to animal products, and more specifically to a device for automatically providing water to animals.

BACKGROUND

Animal care providers, such as people responsible for the care of pet dogs and/or cats, may not always be available to provide liquid (such as water, fruit juice, electrolyte solutions, medicine, and so on) when the animal requires. To remedy this situation, animal care providers generally utilize various kinds of automatic liquid dispensers. Such automatic liquid dispensers typically store a quantity of liquid and provide it as needed to one or more animals.

SUMMARY

The present disclosure provides an animal liquid dispensing device. The device includes a container removably mounted to a tray such that an orifice in the base of the container is below a fill line of the tray. A flat cap made of a flexible material and including an opening is removably attached to the orifice. A cap adjustment member may exert pressure on the cap and force the cap into a concave shape when the container is mounted to the tray.

When liquid in the tray is below the fill line and the cap is concave, the container may dispense liquid into the tray. However, when the liquid in the tray is above the fill line, pressure forms within the container and prevents liquid from entering the tray. Regardless of whether or not the liquid is above the fill line, if the cap is in the flat shape surface tension of the liquid in the container prevents the container from dispensing liquid into the tray. However, forcing the cap into the concave shape disrupts the surface tension of the liquid and allows the container to dispense the liquid into the tray (if the liquid in the tray is not already above the fill line).

In some implementations, the cap adjustment member is positioned on a surface of the tray and may contact the cap to exert the pressure on the cap when the container is removably mounted to the tray. In other implementations, the cap adjustment member is positioned on a surface of the cap and contacts the tray to exert the pressure on the cap when the container is removably mounted to the tray.

The features of the disclosed liquid dispensing device enable easy (without significant difficulty) cleaning of the container. The orifice in the base of the container is able to be as wide as necessary to allow for brushes or other cleaning implements to clean the inside of the container without adversely affecting operation of the liquid dispensing device. This is because the cap may effectively restrict the diameter of the orifice during operation and is operable to be removed when the container is to be cleaned. The cap adjustment member may prevent surface tension related to the cap from hindering dispensing of liquid during operation by forcing the cap into the concave shape when the container is mounted to the tray.

It is to be understood that both the foregoing general description and the following detailed description are exemplary and explanatory only and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
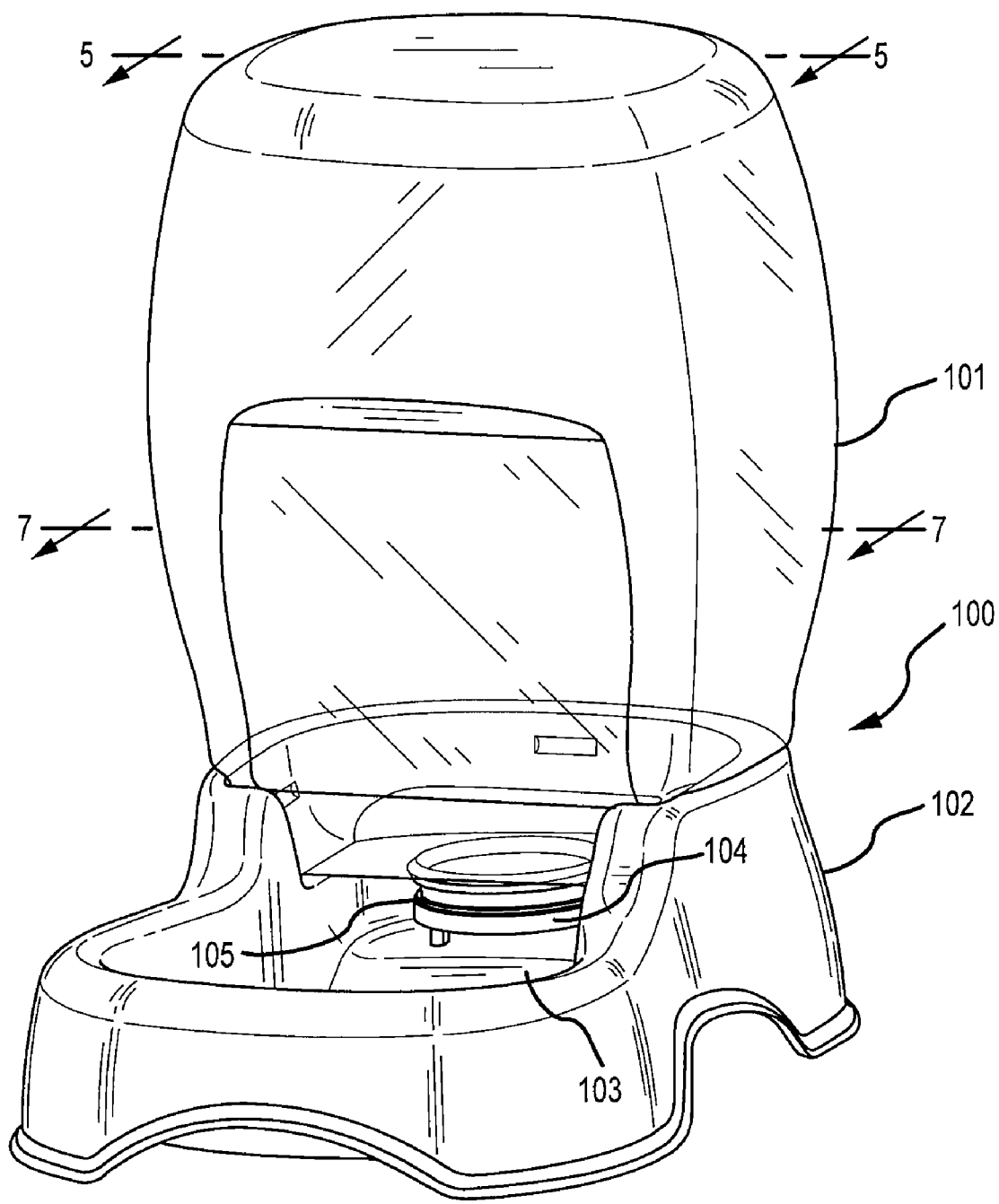
FIG. 1 is an isometric view of a first example of a liquid dispensing device for animals, in accordance with an embodiment of the present disclosure.

The description that follows includes exemplary systems and apparatuses that embody techniques of the present disclosure. However, it is understood that the described disclosure may be practiced without these specific details. Reference will now be made in detail to the subject matter disclosed, which is illustrated in the accompanying drawings.

Gravity-based automatic liquid dispensers generally include a tray that defines a basin connected to a container or reservoir (often resembling an inverted bottle). The container is attached above the tray and includes an orifice at a lower portion of the container for liquid to exit and fill the basin. The orifice is positioned on the container so that it is below the top edge of the tray and will be submerged when liquid in the basin is above a fill line. The orifice is so positioned in order for gravity to pull liquid from the container only when the liquid has not reached the fill line. When the liquid reaches the fill line, because the portion of the container that is not submerged is not vented, the balance of pressure will keep additional liquid from exiting the container. When liquid is removed from the basin (such as by an animal drinking), the pressure is no longer balanced and liquid exits the container to refill the basin. When the liquid in the basin reaches the fill level again, the pressure balances and the liquid stops exiting the container.

However, the diameter of the orifice must be sufficiently narrow in order for enough pressure to form to prevent liquid from exiting the container when the liquid reaches the fill line. If the diameter of the orifice is too wide, the pressure will not balance when the liquid in the basin reaches the fill line. Hence, liquid will not stop exiting the container and the basin will overflow. Thus, such a gravity-based automatic liquid dispenser would not be functional as it would not provide the liquid as needed. Further, the wider the diameter of the orifice, the faster gravity pulls liquid from the container (i.e. gravity pulls a greater volume of liquid from the container in a given amount of time) when the pressure is not balanced. Because air enters the container to displace the liquid as the liquid exits, if gravity pulls the liquid from the container too fast large air bubbles may result. These air bubbles may create audible noise that may frighten an animal drinking from such a gravity-based automatic liquid dispenser. If an animal is frightened or disturbed when using a gravity-based automatic liquid dispenser, the animal may avoid the dispenser. This also frustrates the purpose of such a dispenser, even if the dispenser is otherwise functional, as the animal does not make use of it.

If the diameter of the orifice is not sufficiently narrow to either prevent liquid from exiting the container when the liquid is above the fill line or prevent liquid from exiting the container fast enough to generate audible noise from air bubbles, a cap may be attached to the orifice. The cap may include an opening that has a narrower diameter than that of the orifice. Thus, because the cap has a narrower diameter, the cap may enable sufficient pressure to form to prevent liquid from exiting the container when the liquid reaches the fill line. The narrower diameter of the cap may also prevent gravity from pulling liquid from the container too quickly such that audible noise from air bubbles is not generated.

However, if the cap has a flat shape, surface tension of the liquid may prevent liquid from exiting the container even when the liquid has not reached the fill line. Hence, a mechanism to alter the flat shape of the cap may be used disrupt the surface tension of the liquid and allow the liquid to exit the container when the liquid has not reached the fill line.

Among other things, he present disclosure provides such a mechanism for a gravity-based automatic liquid dispenser. In one embodiment, the dispenser includes a protrusion that contacts and exerts force upon the cap when the container is attached to the tray. The force exerted by the protrusion upon the cap is sufficient to force the cap into a concave shape. The concave shape of the cap operates to disrupt the surface tension of the liquid in the container, allowing the container to dispense liquid into the tray if the liquid is not already above the fill line. However, if the liquid in the tray is above the fill line, pressure formed within the container still prevents the container from dispensing liquid even if the cap is in the concave shape.

Thus, the automatic liquid dispenser can have a container including an orifice much wider than that necessary to generate sufficient pressure to keep liquid in the container when liquid in the tray is above the fill line. The cap reduces and/or partially blocks the orifice, effectively reducing the diameter of the orifice to the diameter of the opening in the cap. As the protrusion alters the flat shape of the cap, surface tension of the liquid does not prevent the container from dispensing liquid when the container is attached to the tray. Hence, the diameter of the orifice can be wide enough to allow for easy cleaning of the container as the cap can be removed during cleaning and replaced again before use.

FIG. 1 is an isometric view of a first example of an automatic liquid dispensing system 100. As illustrated, the system 100 includes a container 101 that is operable to store a quantity (such as one quart, three quarts, two liters, one gallon, and so on) of liquid and a tray 102 that includes a basin. The container 101 includes a flat-shaped cap 104 that is removably attached to an orifice 105 in the base of the container 101. The tray 102 includes a bottom surface 103 that slopes from a mounting shelf 108 at the back of the tray 102 downward to the front of the tray 102. In this example, the bottom surface 103 of the tray 102 includes a cap adjustment member 106.

Figure 2:
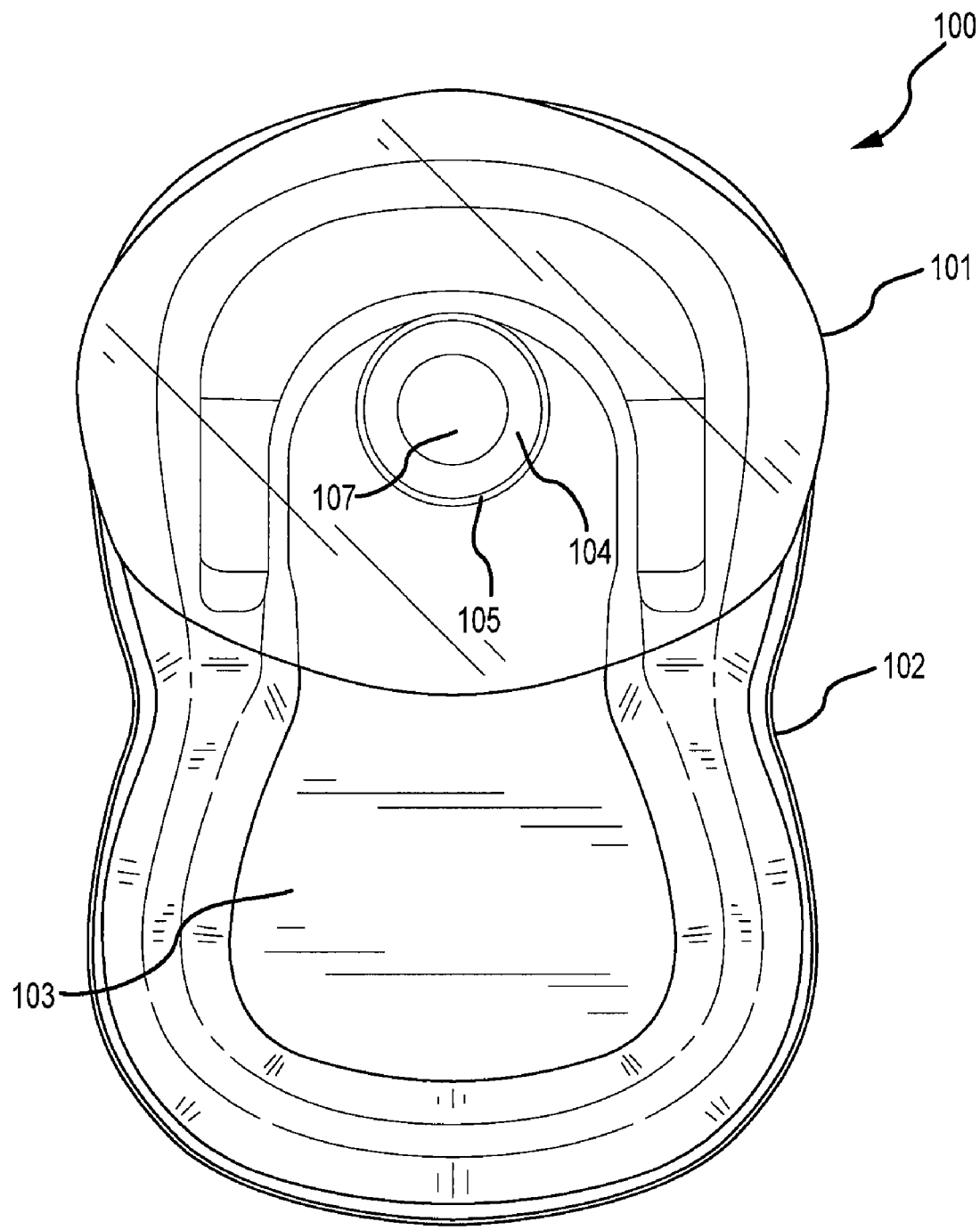
FIG. 2 is a top plan view of the liquid dispensing device of FIG. 1.

The container 101 removably mounts to the tray 102 via the mounting shelf 108 (best shown in FIG. 3) that is positioned at the back portion of the tray 102. Referring again to FIG. 1, the container 101 removably mounts to the tray 102 such that the cap 104 contacts the cap adjustment member 106. FIG. 2 is a top plan view of the system 100. As illustrated, the cap 104 has a narrower diameter than the orifice 105. Also as illustrated, the cap 104 includes an opening 107.

In this example, the tray 102 includes a fill line that is below the top edge of the tray but is above the orifice 105 of the container 101 when the container is removably mounted to the tray. When the liquid is below the fill line and the cap 104 is not in the flat shape, the container is operable to dispense liquid into the basin. In some embodiments, the container 101 may not have any other openings other than the orifice 105, or any other such openings may be plugged. Thus, when the liquid is above the fill line, the balance of pressure within the container 101 prevents the container from dispensing the liquid. When the cap 104 is in the flat shape, surface tension of the liquid the container from dispensing the liquid even when the liquid is below the fill line. However, when the container 101 is removably mounted to the tray 102, the cap adjustment member 106 is operable to alter the shape of the cap 104 (best shown in FIG. 6) such that the surface tension of the liquid is disrupted and the container may thus dispense liquid, if the liquid is below the fill line.

In this example, the diameter of the orifice 105 is sufficiently wide that if the cap 104 is not removably attached to the orifice 105, either sufficient back pressure cannot be formed to prevent liquid from exiting the container 101 when the liquid is above the fill line, or liquid is allowed to exit the container fast enough to generate audible noise from air bubbles. The diameter of the opening 107 in the cap, however, is sufficiently narrow in order to form enough pressure to prevent liquid from exiting the container 101, when the liquid is above the fill line, and to prevent liquid from exiting the container fast enough to generate audible noise from air bubbles.

Figure 3:
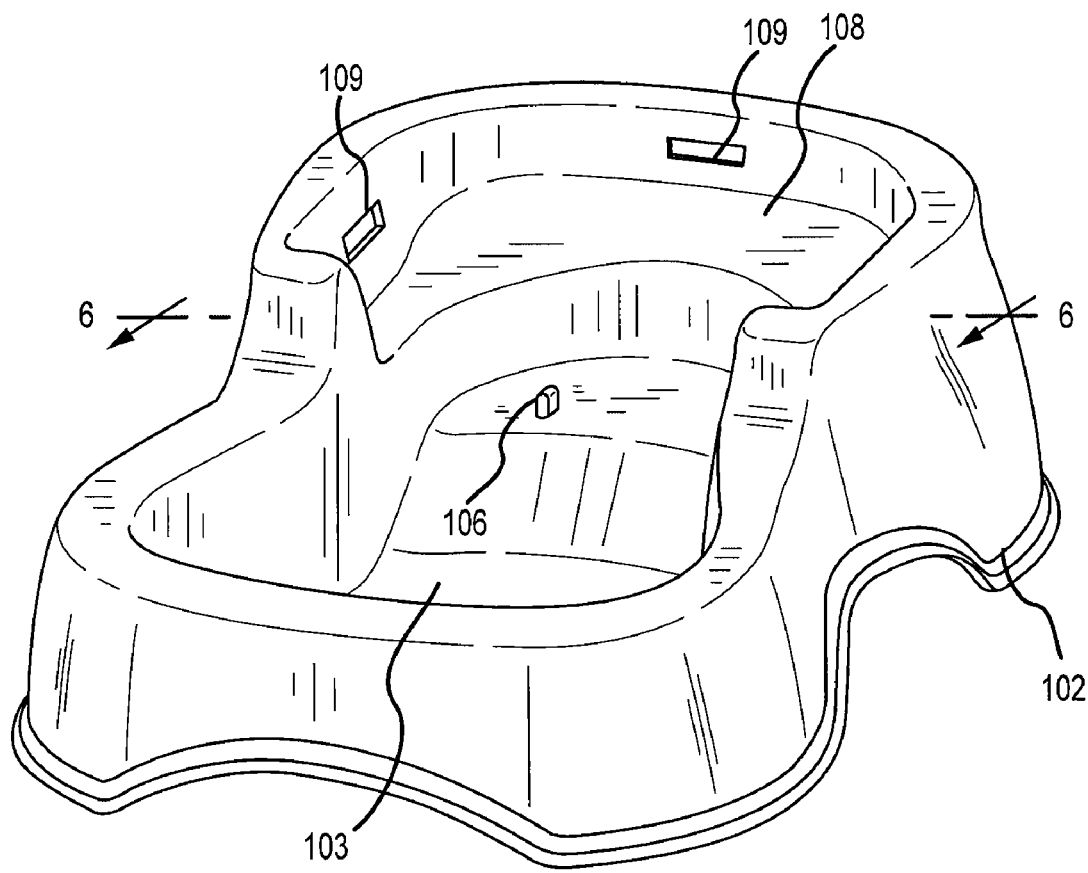
FIG. 3 is an isometric view of the tray of the liquid dispensing device of FIG. 1.

FIG. 3 is an isometric view of the tray 102. As illustrated, the tray 102 includes a mounting shelf 108 configured to secure the base of the container 101 to the tray 102. This shelf may be detachable or separate in other embodiments. The mounting shelf 108 also includes a number of notches 109 that are operable to receive mounting ridges 110 (best shown in FIGS. 4 and 5) of the container 101 to aid in securing the container 101 to the tray 102. Referring now to FIG. 6, a cross-sectional front plan view of the tray 102 is illustrated.

Figure 4:
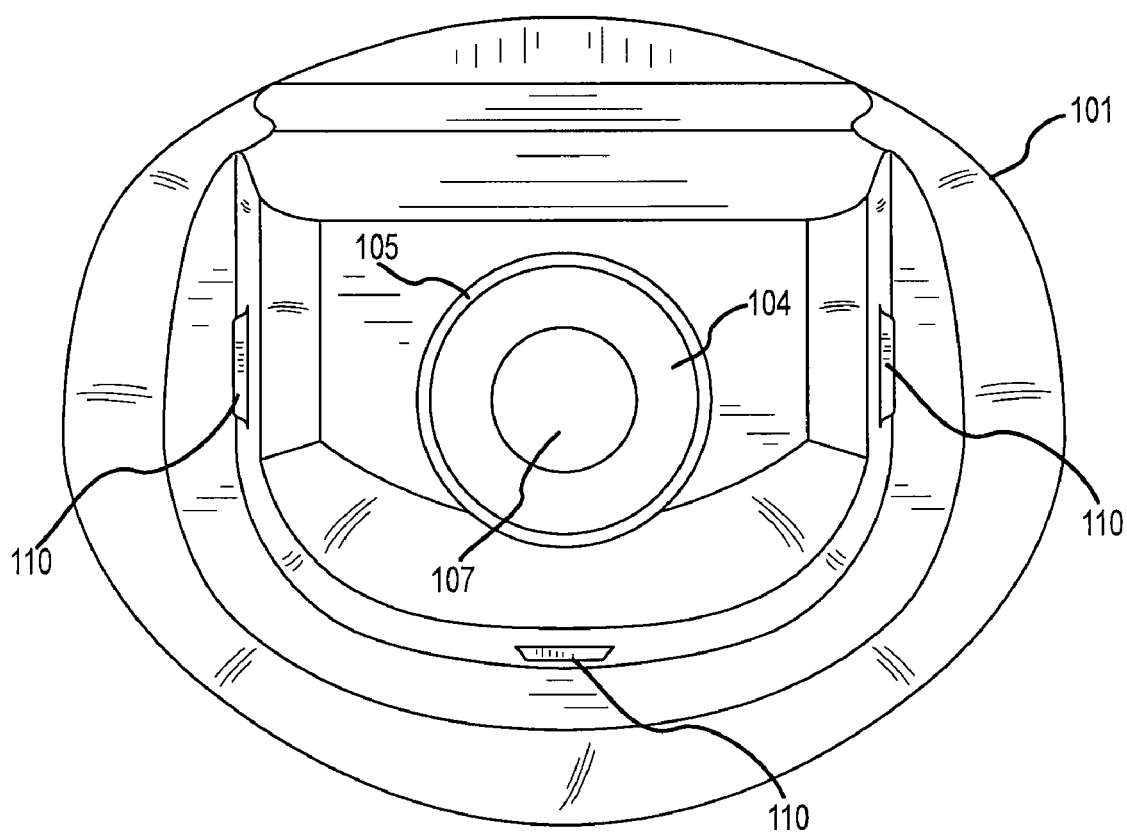
FIG. 4 is a bottom plan view of the container of the liquid dispensing device of FIG. 1.
Figure 5:
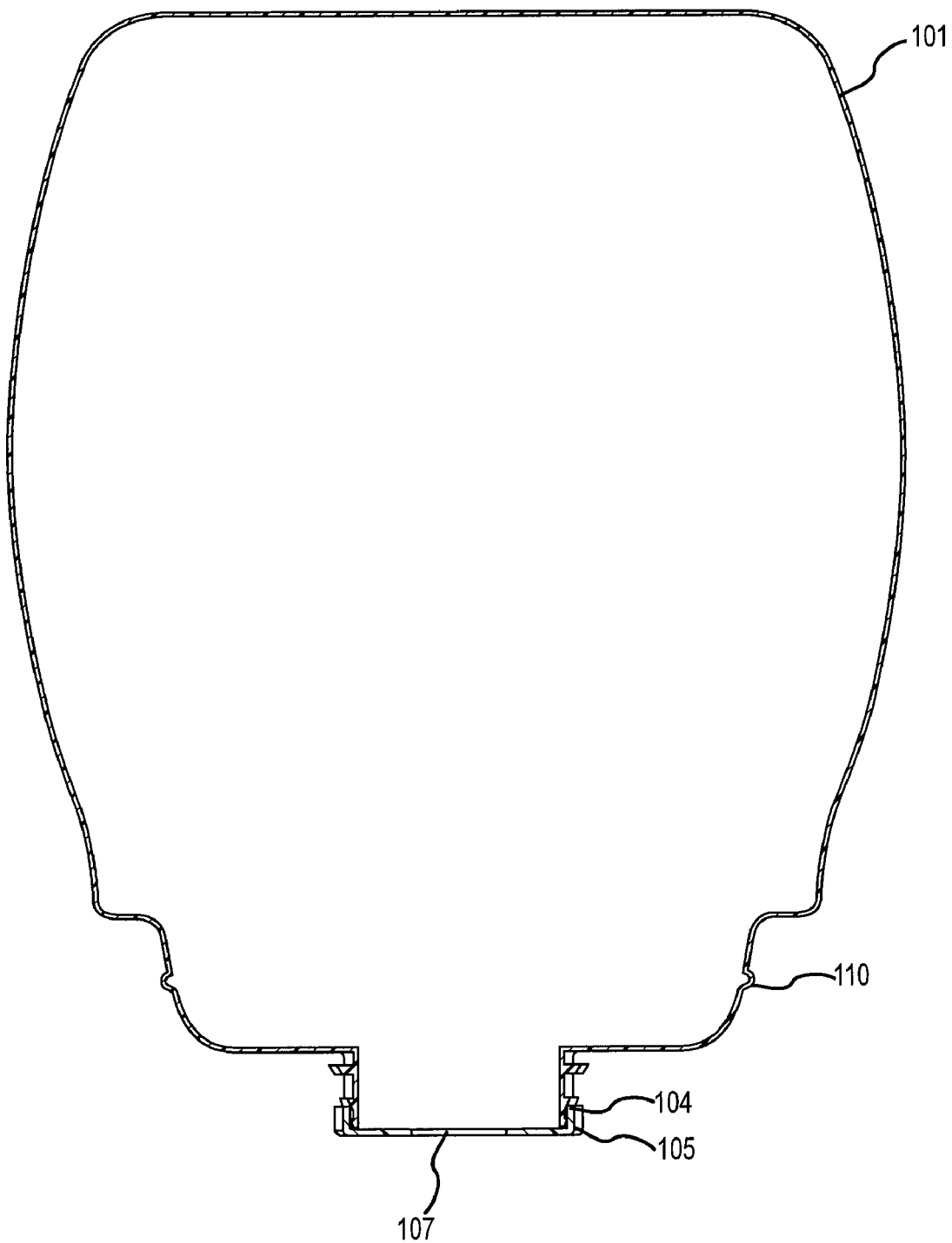
FIG. 5 is a cross-sectional front plan view of the container of the liquid dispensing device of FIG. 1, as taken along line 5-5 in FIG. 1.
Figure 6:
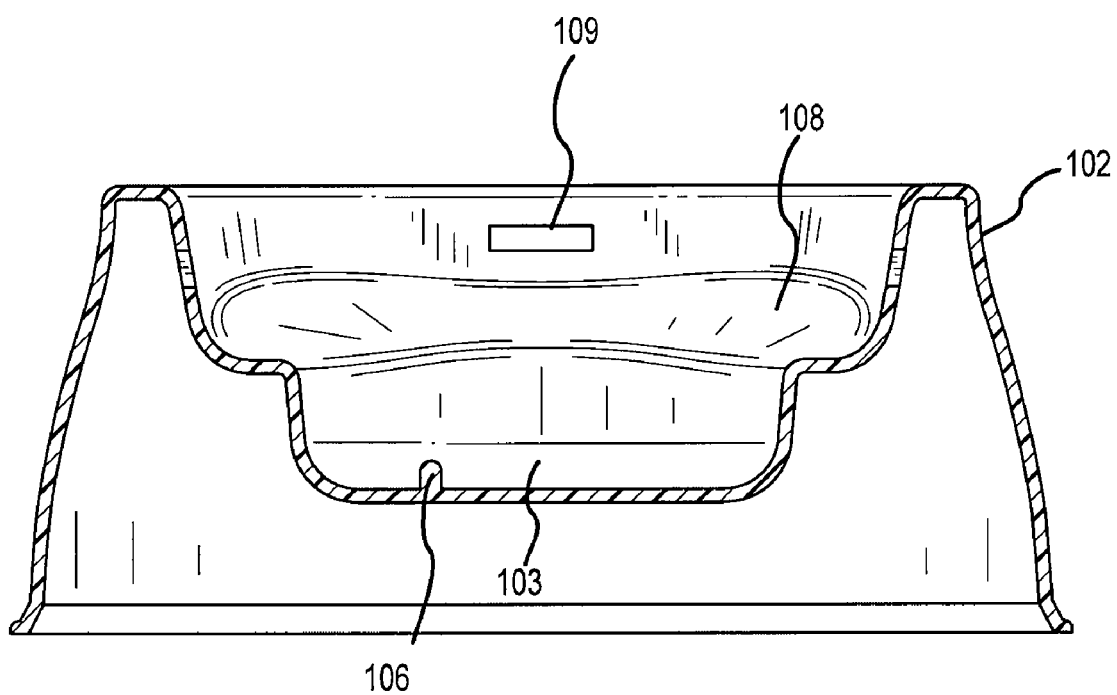
FIG. 6 is a cross-sectional front plan view of the tray of the liquid dispensing device of FIG. 1, as taken along line 6-6 in FIG. 3.

FIGS. 4 and 5 are bottom plan and cross-sectional front plan views of the container 101, respectively. As illustrated, the base of the container 101 is configured to be secured to the tray 102 by the mounting shelf 108 and includes mounting ridges 110 that may engage the notches 109 of mounting shelf 108, thereby aiding in securing the container 101 to the tray 102.

The cap 104 may be removably attached to the orifice 105 by a variety of different removable attachment mechanisms. In one implementation, the cap 104 and the orifice 105 may each include a set of complementary interlocking threads (not shown) and the cap 104 may be removably attached to the orifice 105 by engaging the threads of the cap 104 with the threads of the orifice. In a second implementation, the cap 104 and the orifice 105 may include complementary snapping mechanisms (not shown) to allow the cap 104 to removably attach to the orifice 105 by snapping the cap 104 onto the orifice 104. In some examples, the removable attachment mechanisms may be air tight. However, in other examples, the removable attachment mechanisms may not be air tight. As the cap 104 is submerged when the liquid is above the fill line in this example, the removable attachment mechanism is not required to be air tight in order for sufficient pressure to form to prevent liquid from exiting the container 101 when the liquid is above the fill line.

Figure 7:
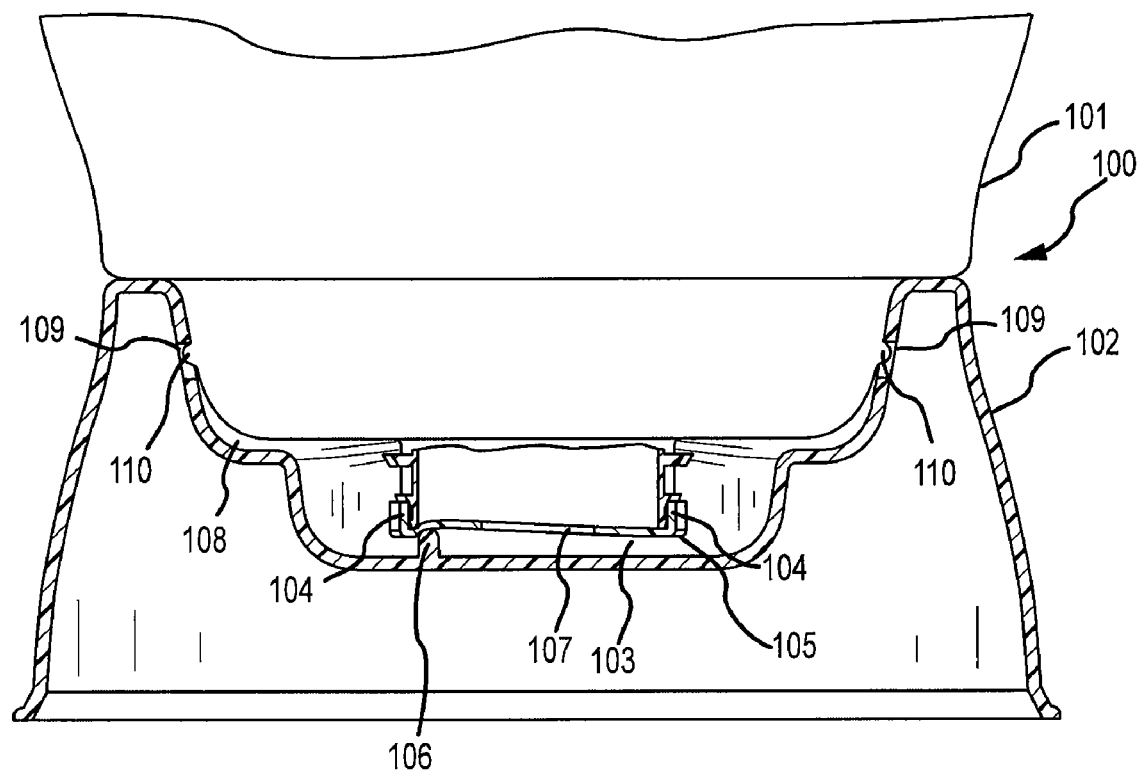
FIG. 7 is a cross-sectional front plan view of the liquid dispensing device of FIG. 1, as taken along line 7-7 in FIG. 1.

FIG. 7 is a cross-sectional front plan view of the system 100. As illustrated, when the container 101 is removably mounted to the tray 102, the cap adjustment member 106 alters the shape of the cap 104 to disrupt the surface tension of the liquid and allow the liquid to exit the container 101 if the liquid is below the fill line. In this example, the cap 104 is composed of a flexible material. The flexible material may be a flexible plastic, rubber, and so on. The material of the cap 104 may be more flexible than the material or materials that compose the container 101 and/or the tray 102. As illustrated, the cap adjustment member 106 is a ridge or protrusion that contacts the cap 104 and exerts pressure to force at least a portion of the cap 104 into a concave shape away from the tray 102. Because the cap 104 is in the concave shape, the surface tension of the liquid is disrupted and the liquid is allowed to exit the container 101 if the liquid is not above the fill line. If the liquid is above the fill line, even if the cap 104 is in the concave shape, the balance of pressure typically prevents the liquid from exiting the container 101.

FIG. 7 illustrates the cap adjustment member 106 as a single protrusion that exerts force on a portion of the cap 104 when the container 101 is removably mounted to the tray 102. However, it is understood that in other implementations the cap adjustment member 106 may include any number of protrusions of various shapes that exert force upon various portions of the cap 104 to force all or part of the cap 104 into the concave shape. For example, the cap adjustment member 106 may include two protrusions on either side of the opening 107 that both contact the cap 104 and exert pressure to force the cap 104 into a concave shape when the container 101 is mounted to tray 102.

Figure 8:
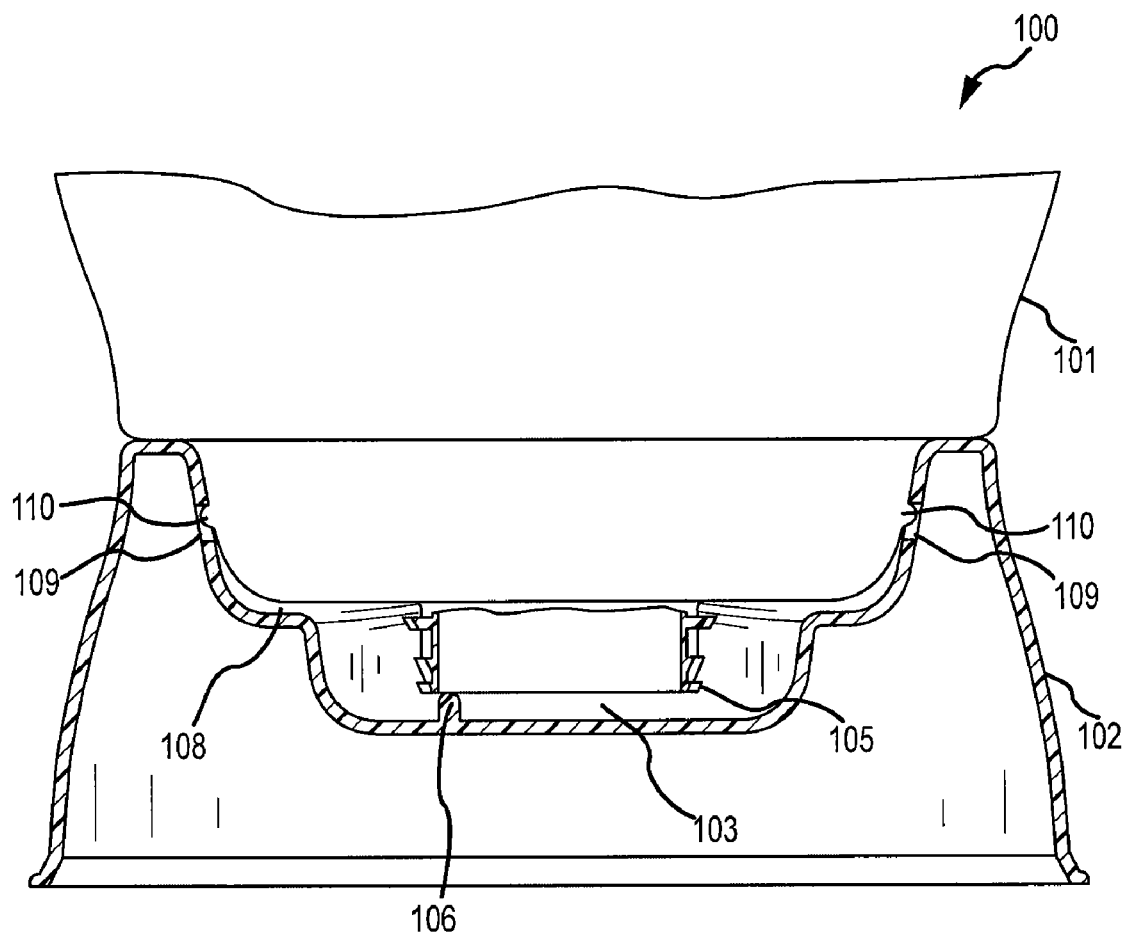
FIG. 8 is a cross-sectional front plan view of the liquid dispensing device of FIG. 1 without the cap, as taken along line 7-7 in FIG. 1.

FIG. 8 is a cross-sectional front plan view of the system 100 where the cap 104 is not removably attached to the orifice 105.

Figure 9:
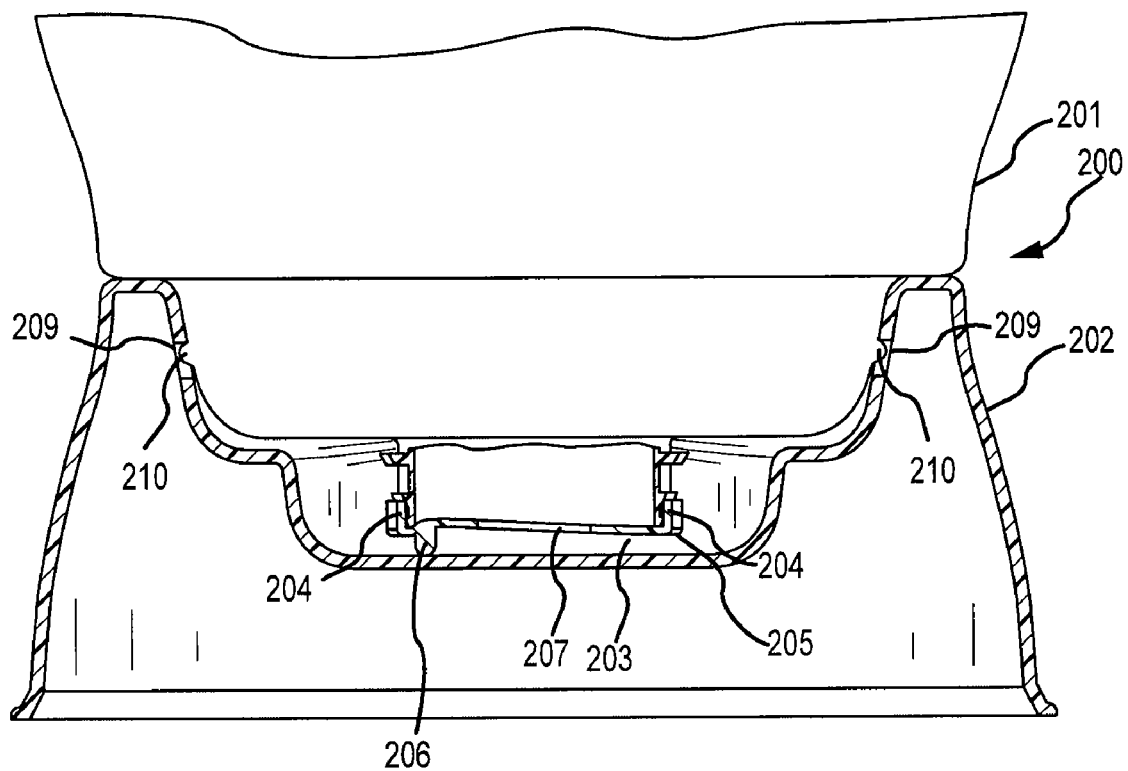
FIG. 9 is a cross-sectional front plan view of a second example of an automatic liquid dispensing device for animals, as taken along a line similar to line 7-7 in a view of the second example of the automatic liquid dispensing device for animals similar to FIG. 1.

FIG. 9 is cross-sectional front plan view of a second example of an automatic liquid dispensing device 200. As illustrated, the device includes a reservoir (or container) 201 removably mounted to a basin 202. The reservoir 201 includes a flat-shaped cap 204 that is removably attached to an orifice 205 in the base of the reservoir 201. The cap 204 may be composed of a flexible material. In this example, the cap 204 includes a cap adjustment member 206 that contacts the basin, exerting pressure to force at least a portion of the cap 204 into a concave shape away from the basin 202, when the reservoir 201 removably mounts to the basin 202. The cap adjustment member 206 may be composed of the same flexible material as the cap 204 so long as the cap adjustment member 206 exerts sufficient force when the reservoir 201 is removably mounted to the basin 202 so force at least a portion of the cap 204 into the concave shape.

In this example, the basin 202 includes a fill line that is below the top edge of the basin 202 but is above the orifice 205 of the reservoir 201 when the reservoir 201 is removably mounted to the basin 202. When the liquid is below the fill line and the cap 204 is in the concave position, liquid is allowed to exit the reservoir 201 into the basin 202. However, when the cap 204 is in the flat shape, surface tension of the liquid prevents liquid from exiting the reservoir 201 even when the liquid is below the fill line. Additionally, when the liquid is above the fill line and the cap 204 is in the concave shape, balance of pressure is operable to prevent the liquid from exiting the reservoir 201.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A liquid dispensing device for animals, comprising:
   a tray comprising a basin;
   a container, operable to store a quantity of liquid, comprising a base including an orifice and a top connected to the base by at least one side wall, the container removably mounted to the tray such that the container extends upwardly from tray and the orifice is within the basin;
   a cap coupled to the container, partially blocking the orifice, the cap including an opening; and
   a cap adjustment member operable to force at least a portion of the cap into a concave shape away from the tray;
   wherein the container is operable to dispense the liquid into the basin when the at least a portion of the cap is in the concave shape and a liquid level of the basin is below a fill line and the container is not operable to dispense the liquid into the basin when at least one of the at least a portion of the cap is not in the concave shape or the liquid level of the basin is not below the fill line.

2. The liquid dispensing device of claim 1, wherein the tray includes the cap adjustment member and the cap adjustment member is operable to exert pressure upon the cap to force the at least a portion of the cap into the concave shape when the container is mounted to the tray.

3. The liquid dispensing device of claim 1, wherein the cap includes the cap adjustment member and the cap adjustment member is operable to exert pressure upon the tray to force the at least a portion of the cap into the concave shape when the container is mounted to the tray.

4. The liquid dispensing device of claim 1, wherein a diameter of the orifice is sufficiently wide that if the cap is not coupled to the container the container dispenses the liquid into the basin regardless whether the liquid level of the basin is below the fill line.

5. The liquid dispensing device of claim 1, wherein a diameter of the opening is sufficiently narrow that if the cap is not in the concave shape surface tension prevents the container from dispensing the liquid into the basin even if the liquid level of the basin is below the fill line.

6. The liquid dispensing device of claim 1, wherein the cap is in a flat shape when the cap adjustment member does not exert pressure on the cap.

7. The liquid dispensing device of claim 6, wherein the cap is removably coupled to the container.

8. An apparatus for automatically dispensing liquid, comprising:
- a tray;
- a container comprising a base including an orifice, the container removably mounted to the tray such that the container extends upwardly from tray and the orifice is within the tray;
- a cap removably coupled to the container over the orifice, the cap including an opening that has a diameter that is narrower than a diameter of the orifice; and
- a cap adjustment member operable to force at least a portion of the cap into a concave shape away from the tray;
- wherein the container is operable to dispense liquid stored in the container into the tray when the at least a portion of the cap is in the concave shape and a liquid level of the basin is below a fill line and the container is not operable to dispense the liquid into the tray when the liquid level of the tray is not below the fill line.

9. The apparatus of claim 8, wherein the cap comprises a flexible material.

10. The apparatus of claim 8, wherein the container is not operable to dispense the liquid into the basin when the at least a portion of the cap is not in the concave shape.

11. The apparatus of claim 10, wherein the container is not operable to dispense the liquid into the basin when the at least a portion of the cap is not in the concave shape because of surface tension of the liquid.

12. The apparatus of claim 8, wherein the container is operable to dispense liquid stored in the container into the tray when the liquid level of the basin is below the fill line and the at least a portion of the cap is in the concave shape because the at least a portion of the cap that is in the concave shape disrupts surface tension of the liquid.

13. The apparatus of claim 8, wherein the cap adjustment member comprises a protrusion extending upward from a surface of the tray toward the cap.

14. The apparatus of claim 8, wherein the cap adjustment member comprises a protrusion extending downward from a surface of the cap toward the tray.

15. A system for automatically dispensing liquid, comprising:
- a basin;
- a reservoir comprising a base including an orifice and a top connected to the base by at least one side wall, the reservoir extending upwardly from the basin such that the orifice is within the basin;
- a cap removably coupled to the reservoir, operable to partially block the orifice, the cap including an opening that has a diameter that is narrower than a diameter of the orifice, the cap comprising a more flexible material than the basin and the reservoir; and
- a cap adjustment member operable to force at least a portion of the cap into a concave shape away from the tray;
- wherein the reservoir is operable to dispense liquid stored in the reservoir into the basin when the at least a portion of the cap is in the concave shape and a liquid level of the basin is below a fill line, pressure inside the reservoir prevents the reservoir from dispensing liquid into the basin when the liquid level of the basin is not below the fill line, and surface tension of liquid prevents the reservoir from dispensing liquid into the basin when the at least a portion of the cap is not in the concave shape.

16. The system of claim 15, wherein the cap adjustment member forcing the at least a portion of the cap into the concave shape disrupts the surface tension of the liquid.

17. The system of claim 15, wherein the cap adjustment member comprises a protrusion extending upward from a surface of the basin toward the cap and the cap adjustment member is operable to exert pressure to force the at least a portion of the cap into the concave shape when the reservoir is mounted to the basin.

18. The system of claim 15, wherein the cap adjustment member comprises a protrusion extending downward from a surface of the cap toward the basin and the cap adjustment member is operable to exert pressure to force the at least a portion of the cap into the concave shape when the reservoir is mounted to the basin.

19. The system of claim 15, wherein the fill line is below a top of the basin.

20. The system of claim 15, wherein the orifice is the only opening in the reservoir.

* * * * *